United States Patent
Hsu et al.

(10) Patent No.: US 7,884,796 B2
(45) Date of Patent: Feb. 8, 2011

(54) LAMP DRIVING STRUCTURE FOR BACKLIGHT MODULE

(75) Inventors: Cheng-Chia Hsu, Chupei (TW); Teng-Kang Chang, Jhudong Township, Hsinchu County (TW); Yun-Ching Wu, Hsinchu (TW); Yu-Cheng Pan, Houlong Township, Miaoli County (TW)

(73) Assignee: Logah Technology Corp., Hsinchu (TW)

( * ) Notice: Subject to any disclaimer, the term of this patent is extended or adjusted under 35 U.S.C. 154(b) by 820 days.

(21) Appl. No.: 11/852,385

(22) Filed: Sep. 10, 2007

(65) Prior Publication Data

US 2009/0066629 A1 Mar. 12, 2009

(51) Int. Cl.
*G09G 3/36* (2006.01)

(52) U.S. Cl. .......................... 345/102; 345/90

(58) Field of Classification Search ........... 345/87–102, 345/204–215; 315/169.1–169.4
See application file for complete search history.

(56) References Cited

U.S. PATENT DOCUMENTS

| 2008/0246420 | A1* | 10/2008 | Mi et al. | 315/312 |
| 2009/0237346 | A1* | 9/2009 | Bai et al. | 345/102 |
| 2010/0181928 | A1* | 7/2010 | Lee et al. | 315/277 |

* cited by examiner

Primary Examiner—Vijay Shankar
(74) Attorney, Agent, or Firm—Chun-Ming Shih

(57) ABSTRACT

A lamp driving structure for backlight module includes a backlight module implemented for disposing a first circuit board and a second circuit board thereon, the first circuit board couples with the second circuit board through a transmission line; the structure further includes at least a square wave controller, two square wave switches, a mutually coupled transformer, a plurality of driving transformers and a plurality of connectors disposed selectively on the first circuit board and the second circuit board, thereby reducing the number of driving transformers and connectors and the area of circuit boards to further reduce the manufacturing cost of the lamp driving device.

4 Claims, 4 Drawing Sheets

LAMP DRIVING STRUCTURE FOR BACKLIGHT MODULE

BACKGROUND OF THE INVENTION

1. Field of the Invention

The present invention relates to a lamp driving structure for backlight module, and more particularly, to a lamp driving structure which can reduce the number of driving transformers and connectors and the area of circuit board used in backlight module.

2. Description of the Prior Art

Please refer to FIG. 1 for a traditional lamp driving structure for backlight module. From the lamp driving structure 1 depicted in FIG. 1, a first circuit board 11 and a second circuit board 12 are disposed on a backlight module 13, and the first circuit board 11 couples with the second circuit board 12 through a transmission line 14; the first circuit board 11 has a square wave controller 111, a square wave switch 112, a plurality of driving transformers 113 and a plurality of connectors 114 disposed thereon, the second circuit board 12 has a square wave switch 121, a plurality of driving transformers 122 and a plurality of connectors 123, and a plurality of connectors 114,123 of the first circuit board 11 and the second circuit board 12 connect to a plurality of lamps to drive the lamps from both ends. However, since a plurality of driving transformers are required on both the first circuit board and the second circuit board, therefore the area of the circuit boards must be designed accordingly, under such structure, how to reduce the number of driving transformers and connectors and the area of circuit boards and to further reduce the manufacturing cost of the lamp driving device, has become an important issue for manufacturers.

Therefore, the above-mentioned traditional lamp driving structure for backlight module presents several shortcomings to be overcome.

In view of the above-described deficiencies of traditional lamp driving structure, after years of constant effort in research, the inventor of this invention has consequently developed and proposed a new lamp driving structure for backlight module in the present invention.

SUMMARY OF THE INVENTION

The present invention is to provide a lamp driving structure for backlight module. The lamp driving structure comprises a few electronic components selectively disposed on circuit boards, thereby reducing the number of driving transformers and connectors and the area of circuit boards to further reduce the manufacturing cost of the lamp driving device and to drive the lamps on both ends.

The present invention is to provide a lamp driving structure for backlight module, the lamp driving structure can help reduce the cost of lamp driving device, simplify manufacturing process, enhance product stability, improve product lifetime and to save installation space.

The present invention discloses a lamp driving structure for backlight module the structure comprises a backlight module implemented for disposing a first circuit board and a second circuit board thereon, said first circuit board couples with said second circuit board through a transmission line; said structure further comprises at least a square wave controller, two square wave switches, a mutually coupled transformer, a plurality of driving transformers and a plurality of connectors disposed selectively on said first circuit board and said second circuit board, thereby reducing the number of driving transformers and connectors and the area of circuit boards to further reduce the manufacturing cost of the lamp driving device.

DETAILED DESCRIPTION OF THE PREFERRED EMBODIMENT

Figure 1:
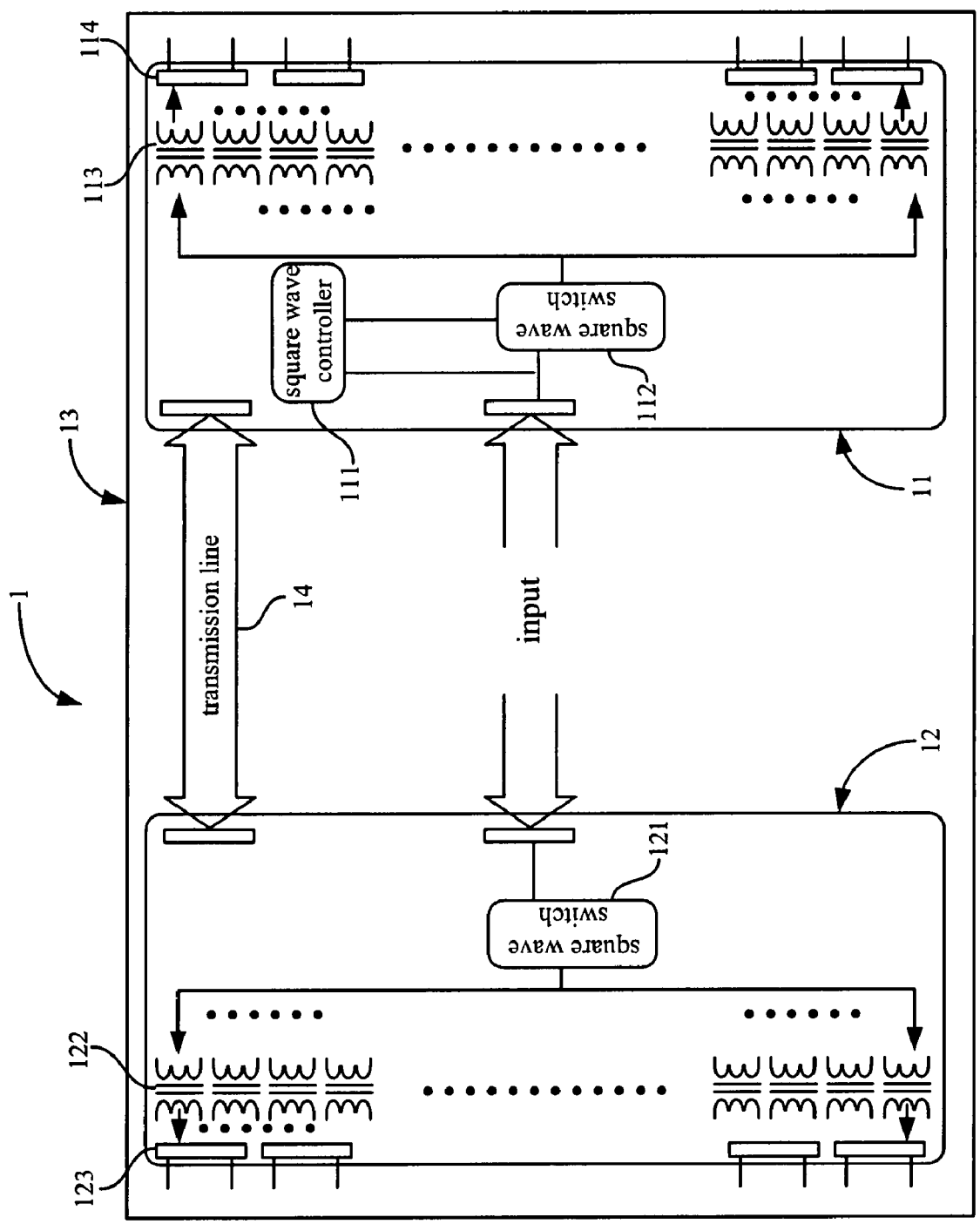
FIG. 1 illustrates a view of a traditional lamp driving structure for backlight module.
Figure 2:
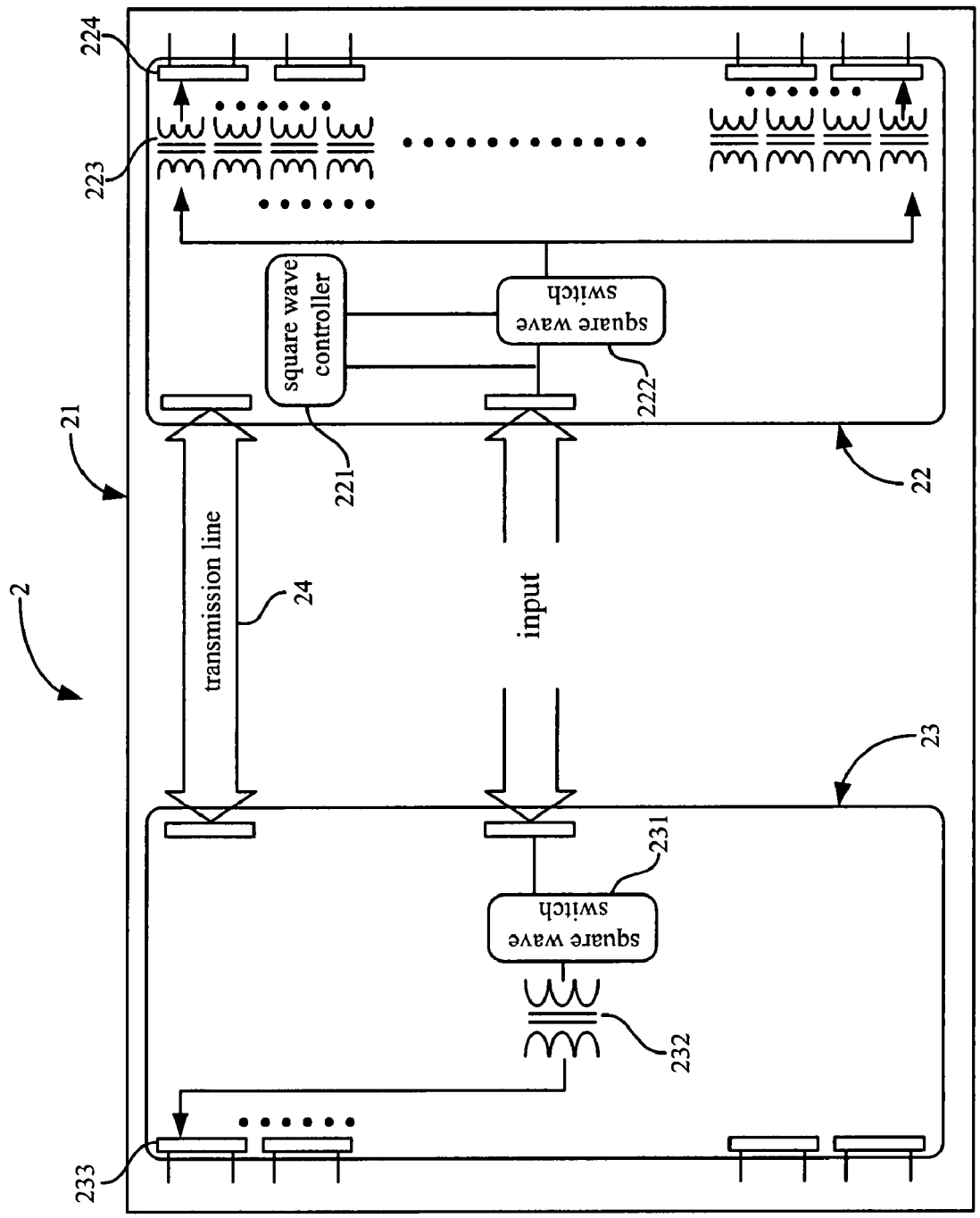
FIG. 2 illustrates a first embodiment of a lamp driving structure for backlight module disclosed in the present invention.

Please refer to FIG. 2 for a first embodiment of a lamp driving structure for backlight module disclosed in the present invention. In FIG. 2, a lamp driving structure 2 comprises a backlight module 21 for liquid crystal display (LCD). The backlight module 21 is implemented for disposing a first circuit board 22, a second circuit board 23 and a transmission line 24 thereon.

The first circuit board 22 comprises a square wave controller 221, a square wave switch 222, a plurality of driving transformers 223 and a plurality of connectors 224. When a DC power is supplied to the square wave controller 221 and the square wave switch 222, the square wave switch 222 receives a control signal from the square wave controller 221 and converts the DC power into an AC power and then outputs the AC power to primary sides of the plurality of driving transformers 223, and then secondary sides of the plurality of driving transformers 223 drive a plurality of lamps through the plurality of connectors 224 based on the AC power.

The second circuit board 23 comprises a square wave switch 231, a mutually coupled transformer 232 and a plurality of connectors 233. When a DC power is supplied to the square wave switch 231, the square wave switch 231 receives the control signal from the square wave controller 221 of the first circuit board 22 through a transmission line 24 and converts the DC power into the AC power for outputting to a primary side of the mutually coupled transformer 232, and then a secondary side of the mutually coupled transformer 232 drives a plurality of lamps through the plurality of connectors 233 based on the AC power. The second circuit board 23 can comprise more than one mutually coupled transformers 232 connecting to a mutually coupled terminal of lamps independently or in series or in parallel for reducing the output power of one mutually coupled transformer 232.

The transmission line 24 is disposed between the first circuit board 22 and the second circuit board 23 and used for transmitting the control signal of the square wave controller 221.

Figure 3:
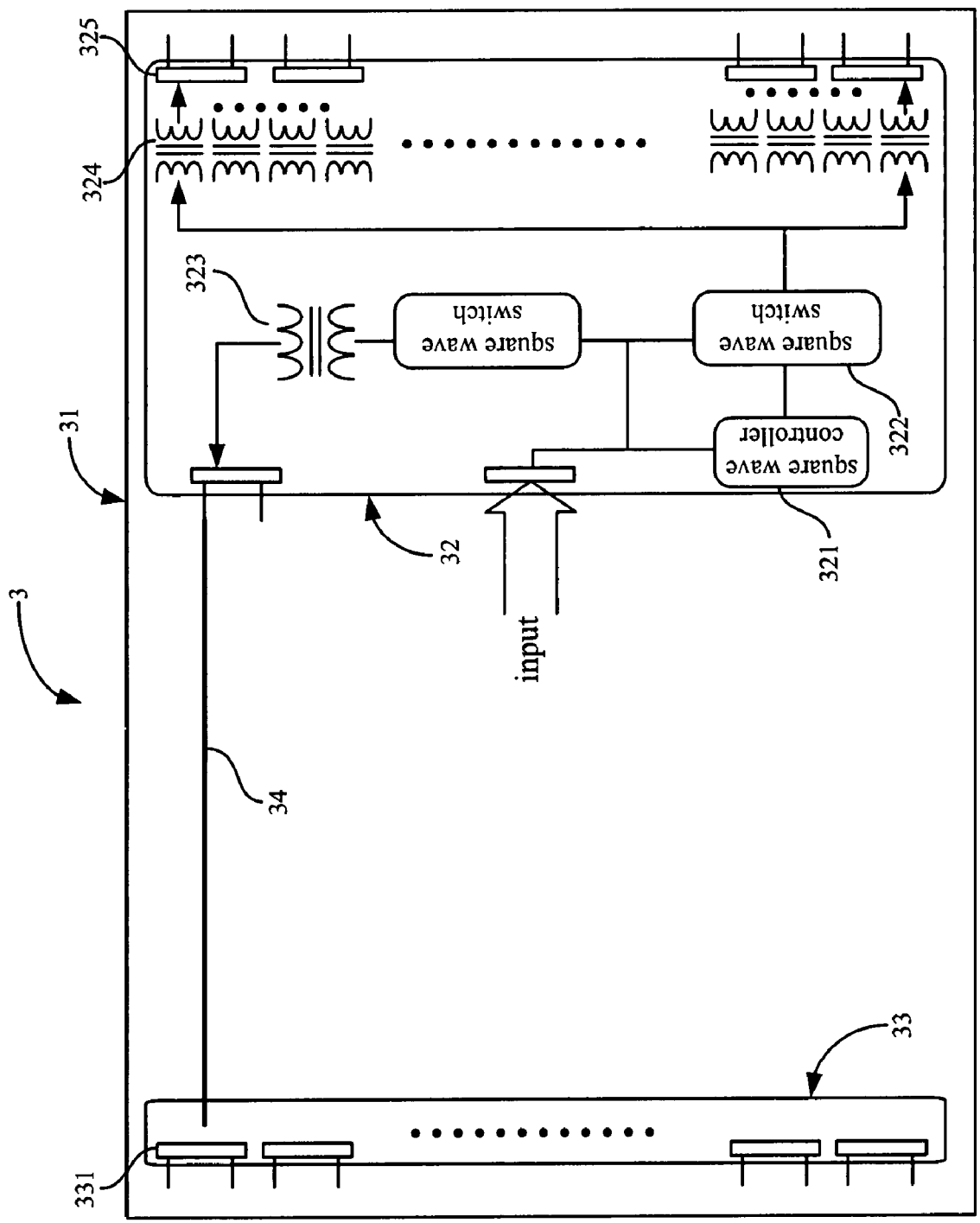
FIG. 3 illustrates a second embodiment of a lamp driving structure for backlight module disclosed in the present invention.

Please refer to FIG. 3 for a second embodiment of a lamp driving structure for backlight module disclosed in the present invention. In FIG. 3, a lamp driving structure 3 comprises a backlight module 31 for liquid crystal display. The backlight module 31 is implemented for disposing a first circuit board 32, a second circuit board 33 and a set of high voltage transmission lines 34 thereon.

The first circuit board 32 comprises a square wave controller 321, two square wave switches 322, a mutually coupled transformer 323, a plurality of driving transformers 324 and a plurality of connectors 325. When a DC power is supplied to the square wave controller 321 and two square wave switches 322, two square wave switches 322 receive a control signal from the square wave controller 321 and convert the DC power into a first AC power and then output the first AC power to primary sides of the mutually coupled transformer 323 and the plurality of driving transformers 324 respectively, and then the secondary side of the mutually coupled transformer 323 outputs a second AC power to the second circuit board 33 through the set of high voltage transmission lines 34, while secondary sides of the plurality of driving transformers 324 also output the second AC power through the plurality of connectors 325 to drive a plurality of lamps;

The second circuit board 33 comprises a plurality of connectors 331 for receiving the second AC power from the set of high voltage transmission lines 34 and driving the plurality of lamps.

The set of high voltage transmission lines 34 is disposed between the first circuit board 32 and the second circuit board 33 for transmitting the second AC power outputted from the mutually coupled transformer 323.

Figure 4:
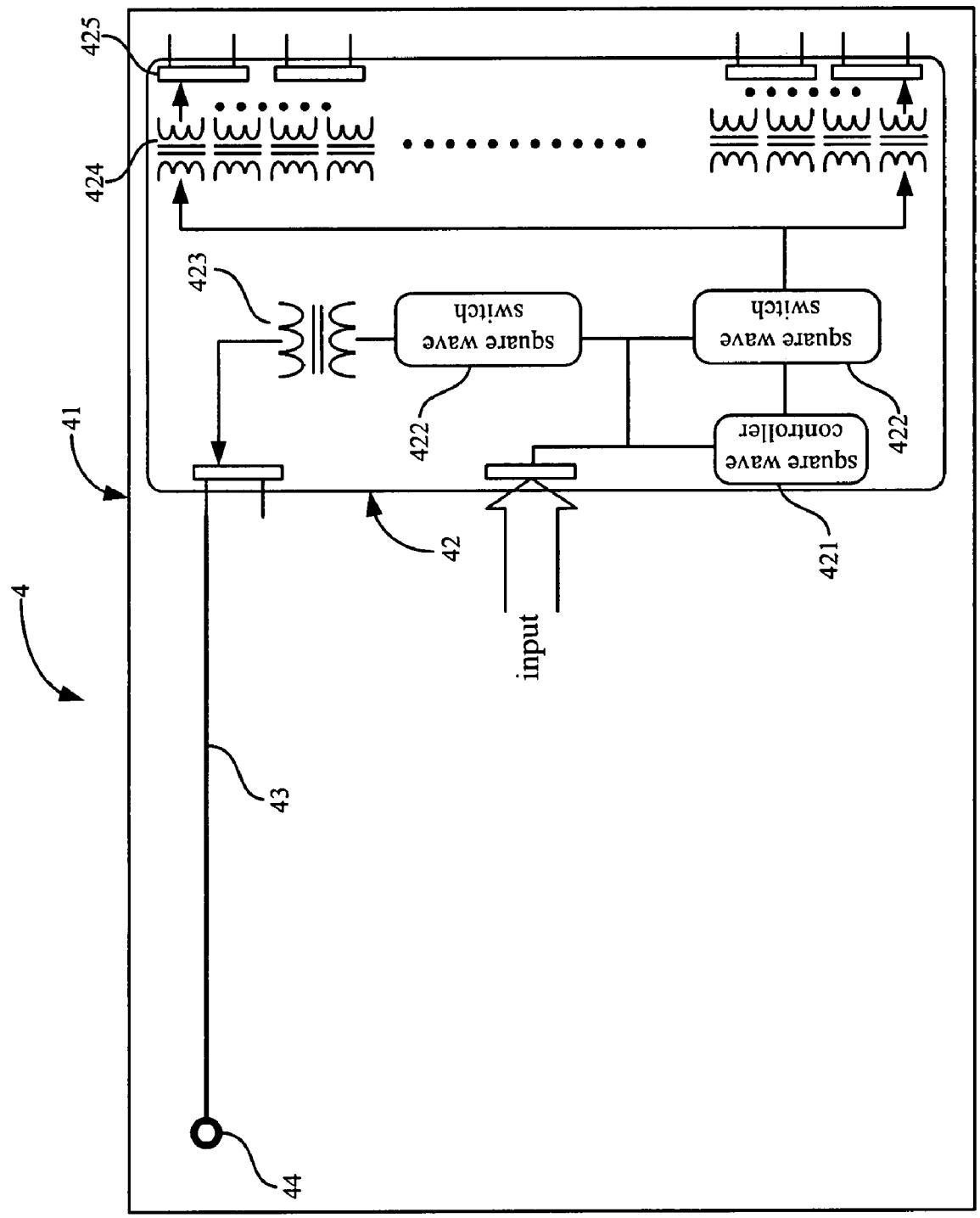
FIG. 4 illustrates a third embodiment of a lamp driving structure for backlight module disclosed in the present invention.

Please refer to FIG. 4 for a third embodiment of a lamp driving structure for backlight module disclosed in the present invention. In FIG. 4, a lamp driving structure 4 comprises a backlight module 41 for liquid crystal display, the backlight module 41 is implemented for disposing a circuit board 42 and a set of high voltage transmission lines 43 thereon.

The circuit board 42 comprises a square wave controller 421, two square wave switches 422, a mutually coupled transformer 423, a plurality of driving transformers 424 and a plurality of connectors 425. When an DC power is supplied to the square wave controller 421 and two square wave switches 422, two square wave switches 422 receive a control signal from the square wave controller 421 and convert the DC power to a first AC power, and then output the first AC power to primary sides of the mutually coupled transformer 423 and the plurality of driving transformers 424 respectively, and then the secondary side of the mutually coupled transformer 423 outputs a second AC power to a mutually coupled terminal of lamps 44 through the set of high voltage transmission lines to further drive a plurality of lamps on one side of the backlight module 41, while secondary sides of the plurality of driving transformers 424 also output the second AC power through the plurality of connectors 425 to drive a plurality of lamps.

The set of high voltage transmission lines 43 is disposed for transmitting the second AC power outputted from the mutually coupled transformer 423 to a mutually coupled terminal of lamps 44.

The present invention provides a lamp driving structure for backlight module, while compared to other traditional lamp driving structures, is advantageous in that:

1. The present invention provides a lamp driving structure for backlight module. The lamp driving structure comprises a few electronic components selectively disposed on circuit boards, thereby reducing the number of driving transformers and connectors and the area of circuit boards to further reduce the manufacturing cost of the lamp driving device and to drive the lamps on both ends.
2. The present invention provides a lamp driving structure for backlight module, the lamp driving structure can help reduce the cost of lamp driving device, simplify manufacturing process, enhance product stability, improve product lifetime and to save installation space.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A lamp driving structure for backlight module, comprising:
    a backlight module for a liquid crystal display, said backlight module being implemented for disposing a first circuit board, a second circuit board and a transmission line thereon;
    said first circuit board comprising a square wave controller, a first square wave switch, a plurality of driving transformers and a plurality of connectors; when a DC power is supplied to said square wave controller and said first square wave switch, said first square wave switch receives a control signal from said square wave controller and converts said DC power into an AC power and then outputs said AC power to primary sides of said plurality of driving transformers, and then secondary sides of said plurality of driving transformers drives a plurality of lamps through said plurality of connectors based on said AC power;
    said second circuit board comprising a second square wave switch, a mutually coupled transformer and a plurality of connectors; when the DC power is supplied to said second square wave switch, said second square wave switch receives said control signal from said square wave controller of said first circuit board through a transmission line and converts said DC power into said AC power for outputting to a primary side of said mutually coupled transformer, and then a secondary side of said mutually coupled transformer drives said plurality of lamps through said plurality of connectors based on said AC power; and
    said transmission line being disposed between said first circuit board and said second circuit board and used for transmitting said control signal of said square wave controller.

2. The lamp driving structure for backlight module as recited in claim 1, wherein said second circuit board comprises more than one mutually coupled transformer connecting to a mutually coupled terminal of lamps independently or in series or in parallel for reducing the output power of one mutually coupled transformer.

3. A lamp driving structure for backlight module, comprising:
    a backlight module for a liquid crystal display, said backlight module being implemented for disposing a first circuit board, a second circuit board and a set of high voltage transmission lines thereon;
    said first circuit board comprising a square wave controller, two square wave switches, a mutually coupled transformer, a plurality of driving transformers and a plurality of connectors; when a DC power is supplied to said square wave controller and said two square wave switches, said two square wave switches receive a control signal from said square wave controller and convert said DC power into a first AC power and then outputting said first AC power to primary sides of said mutually coupled transformer and said plurality of driving transformers respectively, and then said secondary side of said mutually coupled transformer outputs a second AC power to said second circuit board through said set of high voltage transmission lines, while secondary sides of said plurality of driving transformers also outputs said second AC power through said plurality of connectors to drive a plurality of lamps;

said second circuit board comprising a plurality of connectors for receiving said second AC power from said set of high voltage transmission lines and driving said plurality of lamps; and said set of high voltage transmission lines being disposed between said first circuit board and said second circuit board for transmitting said second AC power outputted from said mutually coupled transformer.

4. A lamp driving structure for backlight module, comprising:

a backlight module for a liquid crystal display, said backlight module being implemented for disposing a circuit board and a set of high voltage transmission lines thereon;

said circuit board comprising a square wave controller, two square wave switches, a mutually coupled transformer, a plurality of driving transformers and a plurality of connectors; when an DC power is supplied to said square wave controller and said two square wave switches, said two square wave switches receive a control signal from said square wave controller and convert said DC power to a first AC power and then outputting said first AC power to primary sides of said mutually coupled transformer and said plurality of driving transformers respectively, and then said secondary side of said mutually coupled transformer outputs a second AC power to a mutually coupled terminal of lamps through said set of high voltage transmission lines to further drive a plurality of lamps on one side of said backlight module, while secondary sides of said plurality of driving transformers also outputs said second AC power through said plurality of connectors to drive a plurality of lamps; and said set of high voltage transmission lines being disposed for transmitting said second AC power outputted from said mutually coupled transformer to a mutually coupled terminal of said plurality of lamps.

* * * * *